(12) United States Patent
Matsunaga et al.

(10) Patent No.: US 7,680,578 B2
(45) Date of Patent: Mar. 16, 2010

(54) VEHICLE GRADIENT ANALYZING APPARATUS

(75) Inventors: Takanori Matsunaga, Tokyo (JP); Marcus Hiemer, Karlsruhe (DE); Joerg Barrho, Karlsruhe (DE)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1438 days.

(21) Appl. No.: 11/052,288

(22) Filed: Feb. 8, 2005

(65) Prior Publication Data

US 2006/0100767 A1 May 11, 2006

(30) Foreign Application Priority Data

Nov. 5, 2004 (JP) ............... 2004-322280

(51) Int. Cl.
*G06F 7/00* (2006.01)
*G06F 17/00* (2006.01)
(52) U.S. Cl. ............... 701/80; 701/94; 701/65
(58) Field of Classification Search ........... 701/80, 701/94, 65; 180/170
See application file for complete search history.

(56) References Cited

U.S. PATENT DOCUMENTS

| | | | | |
|---|---|---|---|---|
| 4,829,438 A * | 5/1989 | Etoh | ............... | 701/94 |
| 5,703,776 A * | 12/1997 | Soung | ............... | 701/65 |
| 5,797,109 A * | 8/1998 | Aminpour et al. | ............... | 701/65 |
| 6,249,735 B1 * | 6/2001 | Yamada et al. | ............... | 701/65 |
| 6,339,749 B1 * | 1/2002 | Rieker et al. | ............... | 702/173 |
| 6,370,470 B1 * | 4/2002 | Yamamura et al. | ............... | 701/96 |
| 6,427,108 B1 * | 7/2002 | Kanasugi et al. | ............... | 701/51 |
| 6,510,374 B1 * | 1/2003 | Saotome et al. | ............... | 701/80 |
| 2003/0033071 A1 * | 2/2003 | Kawasaki | ............... | 701/80 |
| 2004/0006421 A1 * | 1/2004 | Yanase | ............... | 701/124 |
| 2004/0099454 A1 * | 5/2004 | Hughes | ............... | 180/65.2 |
| 2004/0167705 A1 * | 8/2004 | Lingman et al. | ............... | 701/124 |
| 2005/0027423 A1 * | 2/2005 | Minami et al. | ............... | 701/51 |
| 2006/0080023 A1 * | 4/2006 | Hrovat et al. | ............... | 701/82 |
| 2006/0100767 A1 * | 5/2006 | Matsunaga et al. | ............... | 701/80 |

FOREIGN PATENT DOCUMENTS

JP         6-249655 A     9/1994
JP         11-351864 A    12/1999

* cited by examiner

*Primary Examiner*—Khoi Tran
*Assistant Examiner*—Brian J Broadhead
(74) *Attorney, Agent, or Firm*—Sughrue Mion, PLLC

(57) ABSTRACT

A system 10 for determining high accuracy gradient information includes linearization means 20, a sum unit 45, and state space model and observer means 50 for calculating a road gradient χRoad. The linearization means 20 includes an air resistance calculation unit 30 and a rolling resistance calculation unit 40. The means 50 includes a state space model 60 and a state space observer 70. The sum unit 45 determines a total sum wheel force ΣFLij of wheel forces FLij. The linearization means 20 calculates an air resistance force FW and a rolling resistance force FR based on a vehicle velocity vCoG using approximation equations, calculates a linearized total sum force FSum by subtracting the air resistance force FW and the rolling resistance force FR from the wheel forces FLij, and inputs the linearized total sum force FSum to the state space model and observer means 50.

2 Claims, 4 Drawing Sheets

VEHICLE GRADIENT ANALYZING APPARATUS

BACKGROUND OF THE INVENTION

1. Field of the Invention

The present invention generally relates to vehicle dynamics systems and road gradient determination systems associated with the navigation systems, and in particular to new techniques using model based systems for parameter observation.

2. Description of the Related Art

In recent modern navigation systems, it is crucial to distinguish between roads possibly lying on top of each other, which can be found in large cities. The navigation systems require highly reliable information about the road gradient in addition to vehicle positions on plain. For this it is necessary to detect the transition from one road level to another road level.

Conventionally, various road gradient determination systems have been proposed (for example, see Patent Document 1: JP 06-249655 A and Patent Document 2: JP 11-351864 A).

In the road gradient determination systems applied to conventional navigation systems or the like, it is impossible to provide sufficiently accurate position information in respective areas of roads. Therefore, it has not been possible to carry out the accurate gradient determination.

SUMMARY OF THE INVENTION

An object of the present invention is to provide a sufficiently practical road gradient determination system by combining a vehicle models and inertial sensors to obtain the required information to provide a linear state space observer.

According to the present invention, there is provided a system for determining a gradient of a road on which a vehicle drives, the system including linearization means, a sum unit, state space model and observer means, wherein the sum unit sums up forces in a forward/backward direction, which are applied to respective wheels of the vehicle to calculate a total sum wheel force, and the linearization means includes: an air resistance calculation unit for calculating an air resistance force based on a velocity of the vehicle using a non-linear approximation equation; a rolling resistance calculation unit for calculating a rolling resistance force based on the velocity of the vehicle using the non-linear approximation equation; and subtraction unit for subtracting the air resistance force and the rolling resistance force from the total sum wheel force to calculate a linearized total sum force, and wherein the state space model and observer means includes: a state space model for applying a method of linear control theory to the total sum force; and an observer unit for observing the gradient of the road based on a velocity difference between a modelled velocity of the vehicle calculated based on the total sum force using the state space model, and an actually measured velocity of the vehicle.

According to the present invention, based on a linearized total sum force signal, a modelled vehicle velocity is determined using a linear model with a linear state space observer. Based on the velocity difference between the modelled vehicle velocity and an actually measured vehicle velocity, road gradient information is calculated with high accuracy.

DESCRIPTION OF THE PREFERRED EMBODIMENTS

Embodiment 1

Figure 1:
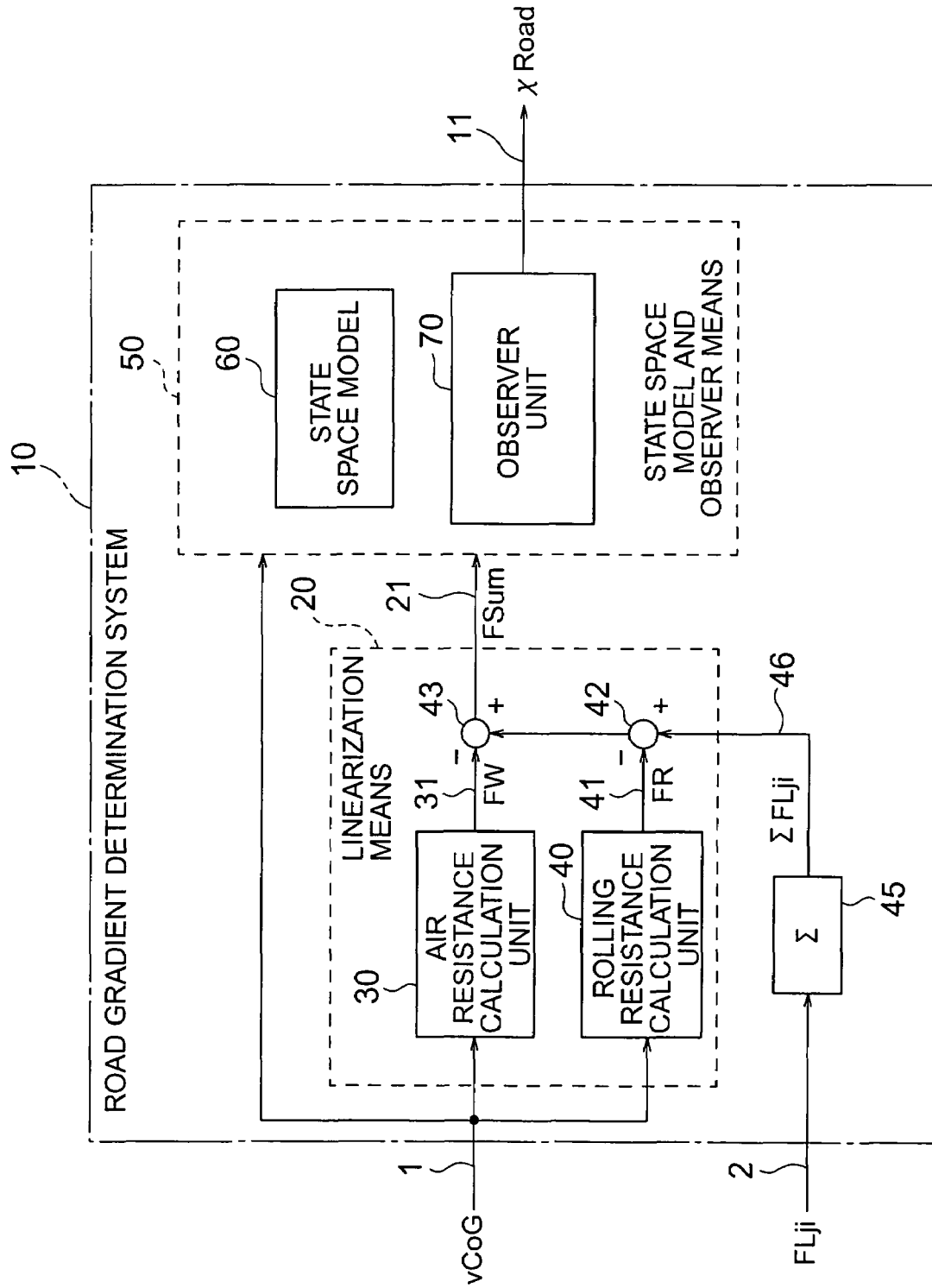
FIG. 1 a block diagram showing a road gradient determination system according to an embodiment 1 of the present invention.

FIG. 1 is a block diagram showing a road gradient determination system 10 according to an embodiment 1 of the present invention.

In FIG. 1, the road gradient determination system 10 includes linearization means 20, a sum unit 45, and state space model and observer means 50.

The road gradient determination system 10 generates gradient information 11 indicating a road gradient χRoad based on input information, i.e., a vehicle velocity signal 1 indicating a vehicle velocity vCoG and a plurality of wheel force signals 2 (indicating wheel forces Flij in a forward/backward direction) obtained from sensors (not shown).

The suffix "ij" of the wheel forces FLij indicates individual wheels. The alphabet "i" indicates a front or rear (F, R) wheel. The alphabet "j" indicates a left or right (L, R) wheel.

Specifically, if "i, j" is substituted by "F, L", it means the front left wheel. If "i, j" is substituted by "F, R", it means the front right wheel. If "i, j" is substituted by "R, L", it means the rear left wheel. If "i, j" is substituted by "R, R", it means the rear right wheel.

The vehicle velocity signal 1 is inputted to an air resistance calculation unit 30, a rolling resistance calculation unit 40, and the state space model and observer means 50. The wheel force signals 2 are inputted to the sum unit 45.

The sum unit 45 calculates the total sum of the individual wheel forces FLij to generate a total sum wheel force signal 46.

The linearization means 20 includes the air resistance calculation unit 30 for calculating an air resistance force FW based on the vehicle velocity vCoG, the rolling resistance calculation unit 40 for calculating a rolling resistance force FR based on the vehicle velocity vCoG, and subtraction units 42, 43 for calculating a linearized total sum force FSum by subtracting the air resistance force FW and the rolling resistance force FR from the total sum vehicle force ΣFLij.

In the linearization means 20, the air resistance calculation unit 30 generates an air resistance force signal 31 indicating the air resistance force FW, and the rolling resistance calculation unit 40 generates a rolling resistance force signal 41 indicating the rolling resistance force FR.

The subtraction unit 42 subtracts the rolling resistance force FR from the total sum wheel force ΣFLij.

The subtraction unit 43 further subtracts the air resistance force FW from the output value from the subtraction unit 42.

That is, the linearization means 20 carries out subtraction processes to the total sum wheel force signal 46 from the sum unit 45 using the air resistance force signal 31 and the rolling resistance force signal 41, and generates a total sum force signal 21 indicating the linearized total sum force FSum (=ΣFLij−FR−FW).

The total sum force signal 21 is inputted to the state space model and observer means 50.

The state space model and observer means 50 includes a state space model 60 and an observer unit 70.

The observer unit 70 calculates a road gradient χRoad using the state space model 60 based on the input information, i.e., the vehicle velocity (vCoG) signal 1 and the total sum force (FSum) signal 21, and generates gradient information 11.

That is, the observer unit 70 is associated with the linear state space model 60 for obtaining the road gradient χRoad, and is part of a linear state space observer.

The gradient information 11 generated by the state space model and observer means 50 is used for detecting transition from one road level to another road level.

The state space model and observer means 50 determines, based on the state space model 60, the balance of forces in the forward/backward direction, which are applied to a ground vehicle, and the model vehicle velocity, and calculates the road gradient χRoad.

At this time, since the linear state space model 60 constituting the linear state space observer is used, the input signal to the state space model and observer means 50 must be linearized. Therefore, the air resistance force FW and the rolling resistance force FR, which show a non-linear dependence from the vehicle velocity vCoG are subtracted from the total sum wheel force ΣFLij by the linearization means 20 which performs the process prior to the process performed by the state space model and observer means 50.

The total sum force signal 21 generated by the linearization means 20 is therefore inputted as a linear input signal to the state space model and observer means 50. This allows the state space model and observer means 50 to design the state space observer based on a linear control theory.

In the state space model and observer means 50, the vehicle velocity modelled by the state space model 60 is compared with the actually measured vehicle velocity vCoG.

The observer unit 70 estimates the road gradient χRoad based on the deviation between the measured vehicle velocity vCoG and the modelled vehicle velocity.

Thus, the gradient information indicating the road gradient χRoad (valuable information about the road situation) is provided to contribute to improvement in the accuracy of latest navigation systems.

The data of the vehicle velocity and the data of the respective wheel forces inputted to the road gradient determination system 10 are obtained by known in-vehicle networks (e.g., sensors).

The state space model and observer means 50 uses input signals (vehicle velocity vCoG and the total sum force FSum) as the measurement signals processed by the state space model 60 and the state space observer 70 to observe the road gradient χRoad by means of observer strategies well known to those skilled in control engineering, and outputs the observed road gradient χRoad as the gradient information 11.

Next, operation of the road gradient determination system 10 based on the vehicle velocity vCoG and the wheel force FLij will be described with reference to specific equations.

The air resistance calculation unit 30 in the linearization means 20 calculates the air resistance force FW corresponding to the vehicle velocity vCoG using the following equation (1) which is a non-linear approximation equation.

[Equation 1] (1)

$$F_W = c_X A \frac{\rho}{2} v_{CoG}^2$$

In the equation (1), cX is the air drag coefficient (constant), A is the vehicle's frontal projected area and p is the air density.

The equation (1) is a well known quadratic dependence of the air resistance force FW against the vehicle velocity vCoG. The air resistance force FW calculated by the equation (1) is inputted as the air resistance force signal 31 to the subtraction unit 43.

Further, the rolling resistance calculation unit 40 calculates the rolling resistance force FR corresponding to the vehicle velocity vCoG using the following equation (2) which is a non-linear approximation equation.

[Equation 2] (2)

$$F_R = f_{R,0} + f_{R,1}\left(\frac{v_{CoG}}{30}\right) + f_{R,4}\left(\frac{v_{CoG}}{30}\right)^4$$

In the equation (2), the coefficients "fR, 0", "fR, 1", "fR, 4" are constant parameters depending on the employed tires.

In the state space model and observer means 50, as described above, the balance of the forces in the forward/backward direction, which are applied to the vehicle is processed.

Therefore, the sum unit 45 calculates the total sum of the forces applied to the individual wheels based on a plurality of wheel force signals 2, and generates the total sum wheel force signal 46.

Further, the subtraction units 42, 43 subtract the rolling resistance force (FR) signal 41 and the air resistance force (FW) signal 31 from the total sum wheel force (ΣFLij) signal 46.

The subtraction of the air resistance force FW and the rolling resistance force FR from the total sum wheel force (ΣFLij) means removal of the non-linear dependence from the vehicle velocity vCoG.

Therefore, the total sum force (FSum) signal 21 inputted from the linearization means 20 to the state space model and observer means 50 is linear, and represented by the following equation (3).

[Equation 3] (3)

$$F_{Sum} = \sum_{ij} F_{Lij} - F_W - F_R$$

Figure 2:
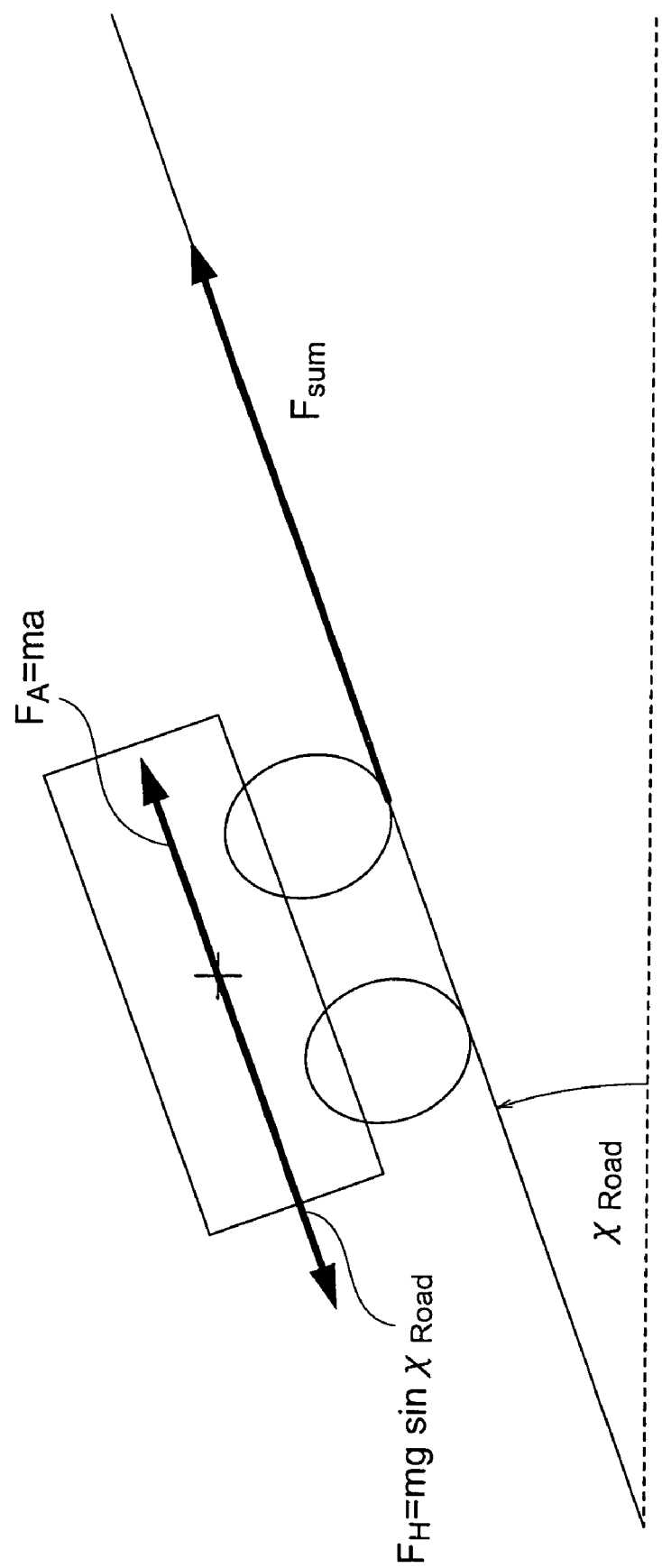
FIG. 2 is a drawing showing forces applied to a vehicle on a slope to which the embodiment 1 according to the present invention is applied, showing balance of forces in a forward/backward direction, which are applied to the vehicle driving uphill.

FIG. 2 is a drawing illustrating the forces in the forward/backward direction, which are applied to a vehicle driving uphill.

In FIG. 2, FH is the downward force applied to the vehicle, and FA (=ma) is the upward force applied to the vehicle.

The vehicle running in the upward direction on the road at a gradient χRoad is driven upwardly by the force FA which is calculated by subtracting the downward force from the total sum force FSum.

At this time, the balance of the respective forces ma, FSum, and FH is represented by the following equation (4).

[Equation 4]

$$ma = F_{Sum} - F_H = F_{Sum} - mg \sin \chi_{Road} \quad (4)$$

Assuming that the road gradient χRoad is not significantly large, the equation (4) can be linearized into the following approximation equation (5).

[Equation 5]

$$ma = F_{Sum} - mg\chi_{Road} \quad (5)$$

The equation (5) is a basic equation for the state space model 60 of the balance of the forces in the forward/backward direction, which is executed in the state space model and observer means 50.

Next, the state space model and observer means 50 will be described further in detail with reference to FIG. 3.

Figure 3:
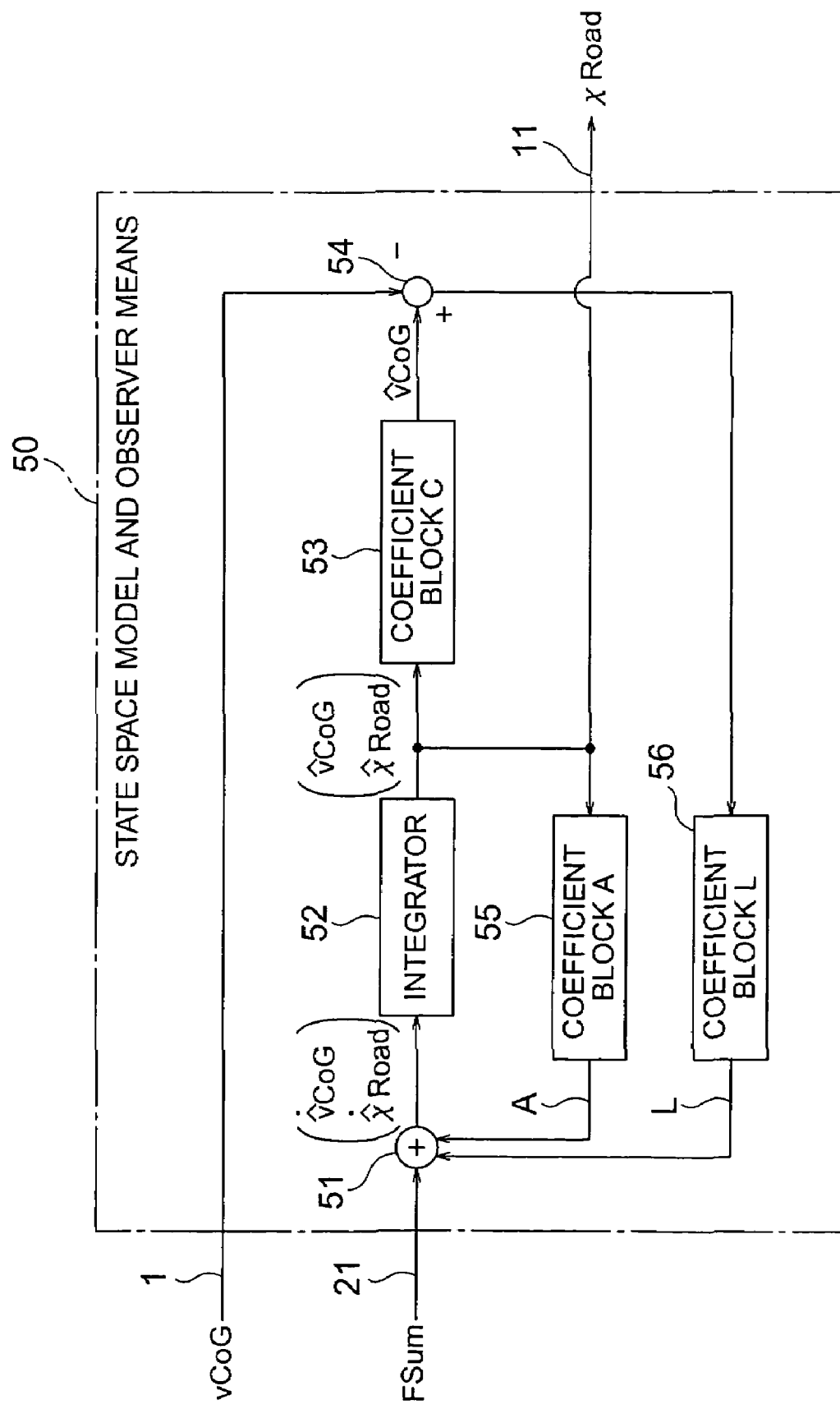
FIG. 3 is a block diagram showing an example of a functional structure of state space model and observer means in FIG. 1.

FIG. 3 is a block diagram showing functional structure of the state space model and observer means 50.

In FIG. 3, the state space model and observer means 50 includes an adder 51, an integrator 52, a coefficient block C 53, a comparator 54, a coefficient block A 55, and a coefficient block L 56. The adder 51 adds an internal feedback coefficient (described later) to the total sum force (FSum) signal 21. The integrator 52 integrates the output signal from the adder 51 to generate a velocity signal (model vehicle velocity) and a gradient signal (model gradient). The coefficient block C 53 multiplies the output signal from the integrator 52 by a predetermined coefficient. The comparator 54 subtracts the model vehicle velocity signal from the vehicle velocity (vCoG) signal 1 to generate a vehicle velocity difference signal. The coefficient block A 55 multiplies the output signal from the integrator 52 by a predetermined coefficient A. The coefficient block L 56 generates an observer matrix L which is selected based on the vehicle velocity difference signal from the comparator 54.

In addition to the total sum force (FSum) signal 21, the coefficients (including the observer matrix L) outputted from the respective blocks 55, 56 are inputted to the adder 51. The integrator 52 estimates (observes) the modelled vehicle velocity signal and gradient signal based on the total sum force FSum and the internal feedback coefficient.

Next, the state space model 60 and the observer unit 70 constituting the state space model and observer means 50 will be described.

The observer unit 70 means "an observing device" which uses "model calculation" for estimating information which cannot be measured actually with ease.

The "model" means a numerical expression represented by a "state equation" using various coefficients and variables (indicating state) so that the real "vehicle" can be reproduced and calculated on a computer. The state space model 60 is a broad term having meaning of the "vehicle model".

In FIG. 3, the vehicle velocity (vCoG) signal 1 is the vehicle velocity value measured by an actual in-vehicle sensor. The model vehicle velocity outputted through the calculation blocks 51 to 56 is obtained by vehicle model calculation.

The state space model and observer means 50 compares the actual vehicle velocity vCoG and the model vehicle velocity using the comparator 54. The coefficient block L 56 sets the observer matrix L (coefficient) so that the velocity difference becomes "0" to generate the vehicle model similar to the actual vehicle.

At this time, in the state space model 60 (vehicle model), the model road gradient as well as the model vehicle velocity are calculated as the "variables indicating the state".

Therefore, the observer unit 70 carries out the processing based on the concept of "if the value of the model vehicle velocity generated using the vehicle model matches the value of the actually measured vehicle velocity vCoG, naturally, the value of the model road gradient calculated in the vehicle model matches the actual gradient value", and is capable of observing (estimating) the gradient value which is not detected by the sensor in reality.

The state space model and observer means 50 calculates the model vehicle speed. In this sense, the state space model and observer means 50 is regarded as the state space model 60 (vehicle model). Meanwhile, the state space model and observer means 50 corrects the model vehicle velocity itself using the coefficient block L 56, and outputs the model road gradient in the model calculation as the estimated value. In this sense, the state space model and observer means 50 is regarded as the observer unit 70.

The coefficient block L 56 selects the observer matrix L such that the velocity difference calculated by the comparator 54 becomes "0". The integrator 52 calculates the model vehicle velocity and the model gradient modelled by integrating the output signal from the adder 51.

Further, when the velocity difference is sufficiently small (e.g., nearly "0"), the state space model and observer means 50 outputs the model gradient outputted form the integrator 52 as the final road gradient χRoad.

The comparator 54 compares the measured vehicle velocity vCoG and the vehicle velocity modeled by the state space model 60 to calculate the velocity difference between the measured vehicle velocity vCoG and the modelled vehicle velocity, and inputs the result to the coefficient block L56.

Thereafter, the observer matrix L is fed back through the coefficient block L56, the road gradient χRoad is estimated based on the velocity difference.

In the state space model and observer means 50, the above basic equation (5) is converted into the state space model 60 as represented by the following equations (6), (7).

[Equation 6]

$$\underbrace{\begin{bmatrix} \dot{v}_{CoG} \\ \dot{\chi}_{Str} \end{bmatrix}}_{\dot{x}} = \underbrace{\begin{bmatrix} 0 & -g \\ 0 & 0 \end{bmatrix}}_{A} \underbrace{\begin{bmatrix} v_{CoG} \\ \chi_{Road} \end{bmatrix}}_{x} + \underbrace{\begin{bmatrix} \frac{1}{m} & 0 \\ 0 & 0 \end{bmatrix}}_{B} \underbrace{\begin{bmatrix} F_{res} \\ 0 \end{bmatrix}}_{u} \quad (6)$$

[Equation 7]

$$\underbrace{\hat{v}_{CoG}}_{y} = \underbrace{\begin{bmatrix} 1 \\ 0 \end{bmatrix}^T}_{C} \underbrace{\begin{bmatrix} v_{CoG} \\ \chi_{Road} \end{bmatrix}}_{x} \quad (7)$$

Note that, a retailed of the state space theory is well known to those skilled in control engineering, and a description thereof is omitted herein.

The state space model 60 is used for designing the state space observer performed in the observer unit 70 which estimates the road gradient χRoad.

The coefficient block L56 appropriately selects the observer matrix L based on the vehicle velocity difference (=v^CoG−vCoG) the model vehicle velocity v^CoG calculated by the state space model 60 and the actually measured vehicle velocity vCoG.

By appropriately selecting the element of the observer matrix L, the gradient (χRoad) information 11 is outputted from the integrator 52.

Next, the calculation processing carried out by the road gradient determination system 10 will be described with reference to a flow chart in FIG. 4.

Figure 4:
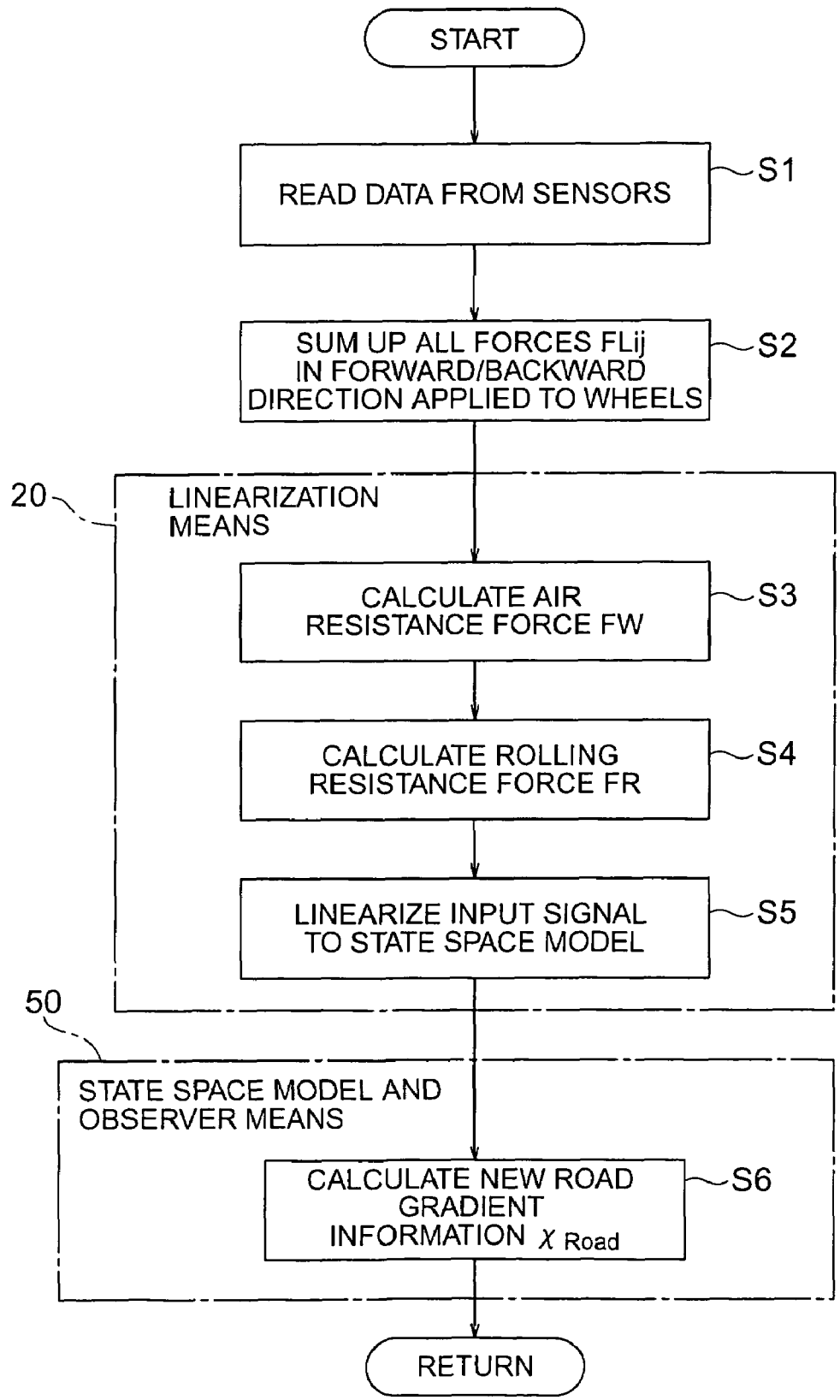
FIG. 4 is a flow chart showing calculation processes carried out by the road gradient determination system according to the embodiment 1 of the present invention.

The process routine in FIG. 4 is performed in each sampling step, and the basic algorithms in the respective process steps S1 to S6 are executed using at least one microprocessor (not shown).

In FIG. 4, firstly, the vehicle velocity vCoG and the wheel forces FLij from the various sensors (e.g., the vehicle velocity sensor and acceleration sensor) are read as data (step S1). Then, the total sum of the forces in the forward/backward direction, which are applied to the wheels is calculated by the sum unit 45 (step S2).

Then, the linearization means 20 carries out the following processes from step S3 to step S5.

Specifically, the air resistance calculation unit 30 uses the above approximation equation (1) to calculate the air resistance force FW (step S3). Likewise, the rolling resistance calculation unit 40 uses the above approximation equation (2) to calculate the rolling resistance force FR (step S4).

Then, the subtraction units 42, 43 use the above equation (3) to subtract the two forces FW, FR from the total sum wheel force ΣFLij in the forward/backward direction, and linearize the input signal 21 to the state space model and observer means 50 (step S5).

Finally, the state space model and observer means 50 executes the state space model represented by the above equations (6), (7), and calculates the road gradient in each calculation step by the linear observer (observer unit 70) designed based on the state space model 60 (step S6) to finish and return the process routine in FIG. 4.

As described above, the road gradient determination system 10 includes the linearization means 20, the sum unit 45, and the state space model and observer means 50.

With the linear observer (state space model 50 and the observer unit 70), the state space model and observer means 50 observes the road gradient (or another uphill slope or downhill slope) using the vehicle velocity (vCoG) signal 1 and the total sum (FSum) signal 21 from the linearization means 20, and generates the information 11 indicating the road gradient χRoad.

The sum unit 45 sums up the detection signals (the wheel forces FLij applied to the respective wheels in the forward/backward direction) from the inertial sensors to calculate the total sum wheel force ΣFLij and input the total sum wheel force ΣFLij to the linearization means 20.

The linearization means 20 includes the air resistance calculation unit 30, the rolling resistance calculation unit 40, and the subtraction units 42, 43. The air resistance calculation unit 30 and the rolling resistance calculation unit 40 use the non-linear approximation equations (1), (2) to calculate the approximate values of the air resistance force FW and the rolling resistance force FR based on the vehicle velocity vCoG. The subtraction units 42, 43 subtract the air resistance force FW and the rolling resistance force FR from the total sum wheel force ΣFLij to calculate the total sum force FSum.

Thus, the input signal 21 to the state space model 60 is linearized, and methods of linear control theory can be applied to the state space model and observer means 50.

In the state space model and observer means 50, based on the state space model 60, the balance of the forces FLij in the forward/backward direction, which are applied to the vehicle on the ground, the vehicle velocity vCoG, and the road gradient χRoad are calculated.

That is, the measured vehicle velocity vCoG is compared with the vehicle speed modelled by the state space model to estimate the road gradient based on the difference between the measured vehicle velocity vCoG and the modelled vehicle speed.

At this time, as described above, the linear model having the linear state space observer is utilized. Thus, the linearization means 20 subtracts the air resistance force FW and the rolling resistance force FR (with the non-linear dependence from the velocity vCoG) to linearize the input signal 21 to the state space model and observer means 50. In this manner, a linear system input 21 can be obtained, and the state space observer can be designed using the methods of linear control theory.

That is, the required linearized information (the total sum force FSum) is obtained from the vehicle velocity vCoG and the detection signals (wheel forces FLij) from the sensors. The state space model 60 (vehicle model) and the observer unit 70 in the state space model and observer means 50 generate the linear state space observer to determine the road gradient χRoad with high reliability.

By detecting the road gradient χRoad accurately, the valuable information about the road condition can be provided accurately. Namely, for example, the accuracy of latest navigation systems can be improved.

For example, by using the determined gradient information 11, with respect to the vehicle equipped with a GPS, transition from one road level to another road level can be detected accurately.

Further, as shown in FIG. 3, the state space model and observer means 50 has the appropriate observer matrix L. Thus, the road gradient (or another uphill slope or downhill slope) can be determined appropriately.

What is claimed is:

1. A system for determining a gradient of a road on which a vehicle drives, comprising:
    a linearization unit;
    a sum unit; and
    a state space model and observer unit, wherein
    the sum unit sums up wheel forces in a forward/backward direction, which are applied to respective wheels of the vehicle, to calculate a total sum wheel force, and
    the linearization unit comprises:
    an air resistance calculation unit for calculating an air resistance force based on a velocity of the vehicle using a non-linear approximation equation;
    a rolling resistance calculation unit for calculating a rolling resistance force based on the velocity of the vehicle using the non-linear approximation equation; and
    a subtraction unit for subtracting the air resistance force and the rolling resistance force from the total sum wheel force to calculate a linearized total sum force, and wherein
    the state space model and observer unit comprises:
    a state space model for applying a method of linear control theory to the total sum force; and
    an observer unit for calculating the gradient of the road based on a velocity difference between a modeled velocity of the vehicle calculated based on the linearized total sum force using the state space model, and an actually measured velocity of the vehicle.

2. The road gradient determination system according to claim 1, wherein the observer unit comprises:
    a comparator for calculating the velocity difference;
    a coefficient block for selecting an observer matrix such that the velocity difference becomes "0";
    an adder for adding the linearized total sum force to the output of the observer matrix; and
    an integrator for integrating an output signal from the adder to determine values of the modeled velocity and the gradient; wherein a gradient value outputted from the integrator is determined as the gradient of the road when the velocity difference is sufficiently small.

* * * * *